(12) United States Patent
Raven et al.

(10) Patent No.: US 10,730,646 B1
(45) Date of Patent: Aug. 4, 2020

(54) OXIDIZER NOZZLE TOOL AND QUICK DISCONNECT SYSTEM FOR FUELING

(71) Applicant: United States of America as represented by the Administrator of NASA, Washington, DC (US)

(72) Inventors: Hans R. Raven, Greenbelt, MD (US); Matthew W. Sammons, Greenbelt, MD (US); Patrick O'Neill, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 64 days.

(21) Appl. No.: 15/957,514

(22) Filed: Apr. 19, 2018

(51) Int. Cl.
 *B64G 4/00* (2006.01)
 *B64G 1/40* (2006.01)
(52) U.S. Cl.
 CPC ............... *B64G 4/00* (2013.01); *B64G 1/401* (2013.01); *B64G 2004/005* (2013.01)

(58) Field of Classification Search
 CPC .................... B64G 4/00; B64G 2004/005
 See application file for complete search history.

(56) References Cited

U.S. PATENT DOCUMENTS

| 2012/0080563 A1* | 4/2012 | Gryniewski | ............. | B25J 11/00 |
| | | | | 244/172.5 |
| 2013/0153710 A1* | 6/2013 | Roberts | ................ | B64G 1/1078 |
| | | | | 244/172.5 |

* cited by examiner

*Primary Examiner* — Richard G Davis
(74) *Attorney, Agent, or Firm* — Matthew F. Johnston; Bryan A. Geurts; Helen M. Galus

(57) ABSTRACT

Disclosed herein is a system including an oxidizer nozzle tool having a first end, a rotary drive and a linear drive mechanism. A component, such as a quick disconnect valve, is attached to the first end of the oxidizer nozzle. The rotary drive actuates the component to engage and seal to a drain valve on a device (such as a satellite) such that the component can open and close the drain value while maintaining the seal, wherein the linear drive mechanism is operable to lock and release the component from the oxidizer nozzle tool. A hose is mated to the oxidizer nozzle tool, wherein upon actuation, fluid flows through the hose to the oxidizer nozzle tool and through the component into the drain valve.

20 Claims, 3 Drawing Sheets

OXIDIZER NOZZLE TOOL AND QUICK DISCONNECT SYSTEM FOR FUELING

BACKGROUND

1. Technical Field

The present disclosure relates to fueling a system and more specifically to an oxidizer nozzle tool and a quick disconnect tool to facilitate on-orbit robotic refueling of satellites or providing media to satellites.

2. Introduction

A potential, and likely, end-of-life event for a satellite is the depletion of propellant. Historically, satellites whose hardware and software components are still functioning properly will be decommissioned or de-orbited because the lack of onboard propellant does not permit proper spacecraft attitude and navigational control. Some of the problems related to trying to refuel a satellite include non-cooperative or legacy refueling interfaces. Satellites can include what are called Fill and Drain Valves (FDVs). The FDVs however are "non-cooperative" in that they were not designed with on-orbit servicing in mind. Compared to a cooperative servicing interface (reference Orbital Express refueling task), non-cooperative interfaces pose unique difficulties and challenges that need addressing. These and other challenges with respect to how one might refuel a satellite are addressed in the present disclosure.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The problem that the oxidizer nozzle tool (ONT) and the quick disconnect (QD) address is to develop a means by which a satellite's operational life can be extended through on-orbit refueling or providing other media. The high-level objectives of the ONT and QD tool system are, by means of robotic actuation, to establish a seal to a client FDV, be able to open the FDV, permit transfer of spacecraft propellant from a satellite servicing spacecraft to the client spacecraft, and close the FDV post-refueling.

The FDVs limitations are what the ONT and QD were designed to interface with—namely that the FDVs belong to legacy satellites. In the satellite servicing industry, a legacy satellite is a satellite that was not designed with on-orbit servicing in mind. Other challenges with refueling satellites include corrosive media. In this instance of the refueling tool system, the ONT and QD were designed to be compatible with Nitrogen Tetroxide (NTO) oxidizer propellant. NTO is a hypergolic spacecraft propellant used in many bi-propellant propulsion systems. From a hardware perspective, NTO can react with many elements in such a manner as to create ignition upon contact with liquid or vapor. For other elements, it has deleterious effects on the material integrity, limiting the component's operational life and functional capability. The ONT and QD had to consider all material reactions in design.

The ONT and QD are operated remotely through robotic actuation. The ONT and QD must provide visual feedback to the remote operators. Robotic operations require unique compliance and functional capability to affect robotic usefulness.

The ONT and QD must accommodate different client satellites. Each client satellite may use a different FDV. The FDV's may vary by form and operation.

There is a need for a refueling tool system that can accommodate multiple satellite interfaces. The purpose of the ONT and QD are to facilitate robotic on-orbit refueling of a non-cooperative satellite. The QD is an end adapter onto the ONT; the QD interfaces to the client FDV. The ONT utilizes two rotary drives to actuate the QD such that the QD can (1) affect a connection to the FDV and (2) open/close the FDV. The ONT also has a linear drive mechanism that locks/releases the QD from the ONT. The ONT is mated to a flexible fuel hose. The fuel hose allows propellant to be transferred from the servicer y into the ONT, and further into the QD and into the client spacecraft via the FDV.

While the current iteration was designed for satellite FDVs, the architecture and approach is extensible to all space assets that could potentially be fueled/refueled on the ground, including but not limited to manned crew vehicles, planetary rovers, and space habitats. In the same vein, the solution is extensible to spacecraft propellants, pressurants, and other media beyond oxidizers.

In one example system, an oxidizer nozzle tool has a first end, a rotary drive and a linear drive mechanism. A component, such as a quick disconnect, is attached to the first end of the oxidizer nozzle. The rotary drive actuates the component to engage and seal to a drain valve on a device (such as a satellite) such that the component can open and close the drain valve while maintaining the seal, wherein the linear drive mechanism is operable to lock and release the component from the oxidizer nozzle tool. A hose is mated to the oxidizer nozzle tool, wherein upon actuation, fluid flows through the hose to the oxidizer nozzle tool and through the component into the drain valve.

DETAILED DESCRIPTION

A system, method and computer-readable media are disclosed which focus on two components, the quick disconnect tool and the oxidizer nozzle tool.

Various embodiments of the disclosure are described in detail below. While specific implementations are described, it should be understood that this is done for illustration purposes only. Other components and configurations may be used without parting from the spirit and scope of the disclosure.

The present disclosure addresses two main components. The quick disconnect (QD) tool is the first tool and is designed to interface with a fuel drain valve on a first end and a oxidizer nozzle tool (ONT) on a second end. The nozzle tool is the second tool disclosed herein.

Figure 1:
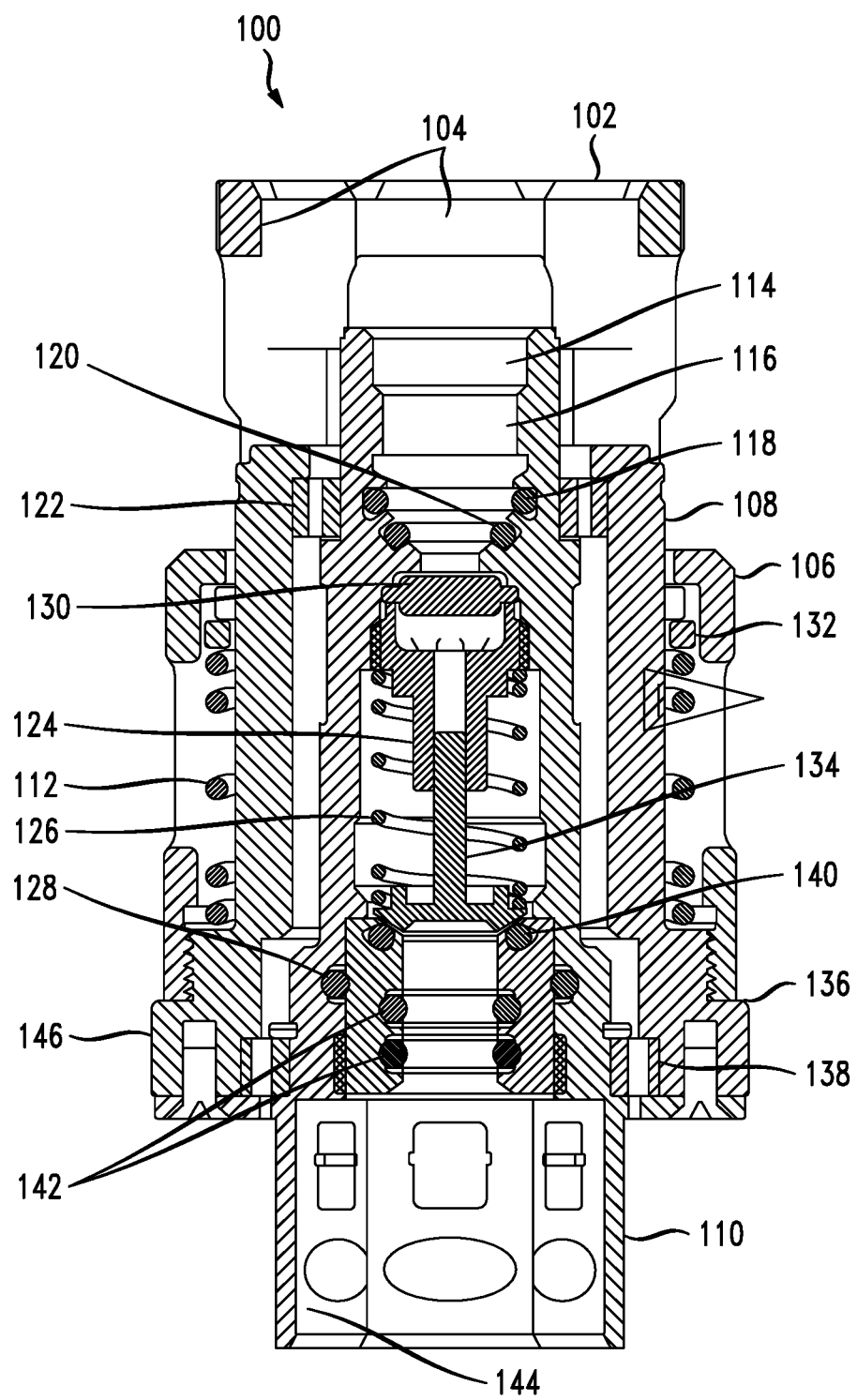
FIG. 1 illustrates an example of the quick disconnect tool.

FIG. 1 illustrates a quick disconnect tool 100. Feature 146 of housing 108 engages to outer rotary driver of ONT.

Feature 144 of valve interface 100 engages to inner rotary drive of ONT. Valve interface 110 rotates within housing 108 on bearing 122 and bearing 138. This permits independent rotary actuation of QD housing 108 and valve interface 110/nut driver 102.

Feature 104 of nut driver 102 is sized to interface with an actuation nut of FDV. Nut driver 102 is splined to housing 108. If, during engagement of QD onto FDV, clocking misalignment exists between nut driver feature 104 and FDV actuation nut, spring 112 compresses and nut driver 102 retracts as valve interface 110 is threaded onto FDV. When nut driver feature 104 and FDV actuation nut are aligned, spring 112 biases out, engaging nut driver onto actuation nut of FDV. Indicator markings on nut driver 102 and structure 106 provide visual feedback to a remote operator. Such feedback will allow the operator to determine whether the nut driver has adequately engaged the actuation nut of the FDV. The nut driver 102 and spring 112 are contained by a structure 106. A structure 132 makes contact between spring 112 and nut driver 102.

Valve interface 110 provides the structure for interfacing with the FDV such that a sealed fluid transfer can occur. To aid alignment between the QD and the FDV, opening 114 helps in a stepwise manner to narrow the diameter of the opening to align the QD to the FDV. Feature 114 represents a diameter that is slightly above the major thread diameter of the FDV.

Feature 116 of valve interface 110 is a thread form that engages the thread form of the FDV. Valve interface is rotated 3 times to fully thread onto the FDV. As the valve interface makes contact with the FDV, O-ring 118 and O-ring 120 create a seal between the QD and the FDV. Surfaces containing O-ring 118 and O-ring 120 are angled at 37 degrees to make contact with the tapered end of the FDV. Other angles are contemplated as well besides 37 degrees. Indicator markings on nut driver 104 provide visual feedback to the operator. Such feedback will allow the operator to count a number of rotations as QD threads onto FDV.

ONT nozzle 202 will insert into QD 100 and press against the poppet 134. View windows and indicator marks on the valve interface 110 provide visual feedback to the operator to aid in ONT-QD mating. O-rings 142 provide a seal between the ONT nozzle and the QD. The ONT nozzle moves the poppet 134 into the poppet guide 124 and will compress the spring 126. Poppet motion will open a pathway to enable fuel to flow from the nozzle 202, through the QD 100, and into the FDV. Openings in the poppet guide 124 enable fluid to flow. When the nozzle 202 is removed, spring 126 biases the poppet back against O-ring 140, creating a seal.

The QD 100 filters propellant as it passes through. The filter 130 is in close proximity to the sealing interface between the QD and FDV. The filter is used to protect the customer or the servicer, depending on the direction of fluid flow, from receiving particulate contaminant from the other spacecraft.

The QD 100 is capable of disconnecting from the ONT and remaining on the FDV as an additional seal for the client satellite. If the primary seal inside the FDV cannot be reestablished post re-fueling (for example, if the FDV seizes prior to fully closing), the QD can operate as a seal for the FDV. This seal is created when the ONT nozzle is removed from the QD and the poppet 134 makes contact with O-ring 140.

The approach used for packaging of the O-rings extends the operational life of the servicer. O-rings have a limited life when exposed to the propellant. Therefore, all O-rings are packaged in the QD. The oxidizer nozzle tool contains no O-rings, meaning its capability will not degrade when exposed to the propellant. The servicer will carry multiple QD's, allowing the system to be used for multiple refueling operations. If the mission propellant were to be changed, the QD O-ring material can be changed. No changes would be required to the oxidizer nozzle tool.

Figure 2:
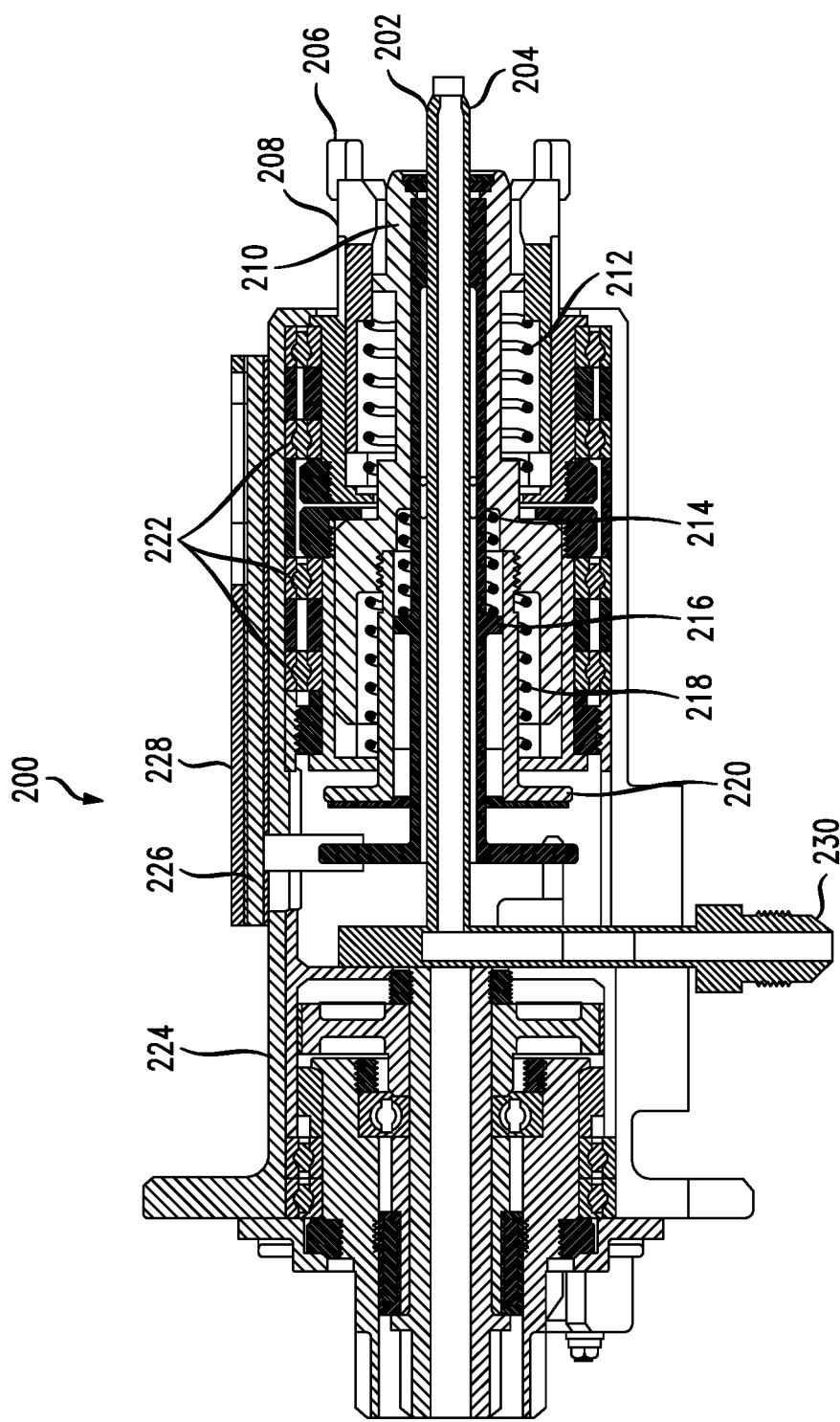
FIG. 2 illustrates the oxidizer nozzle tool.

FIG. 2 illustrates the ONT 200. The ONT 200 main functions are to permit fluid flow from an external source and actuate the QD 100. The ONT 200 is powered and actuated by an external device such as a robotic end effector; it is designed for teleoperation by a human controller. Automated control is also contemplated and within the scope of this disclosure. The high-level architecture incorporates two kickout drives that transfer torque from the end effector, around the Fluid Connector 230, to the end of the ONT 200 that mates to the QD 100. The kickout drive design enables coaxial alignment between the ONT 200 end that mates to the end effector (left side of FIG. 2) and the front end of the ONT 200 which mates to the QD 100. A Housing 224 contains most components. The front end of the ONT consists of an Outer Rotary Drive 208, Hex Drive 210 and Nozzle End 202.

The Outer Rotary Drive 208 uses Spanner Fingers 206 to transfer torque to the QD nut driver 201 via mating recesses in QD housing 108. This functionality is to open and close an FDV actuation nut. Torque is transmitted to the Outer Rotary Drive 208 via a kickout drive spur gear that passes through Housing 224 to actuate a spline drive, supported by Bearings 222, that holds the Outer Rotary Drive 208. The Outer Rotary Drive 208 can tolerate a clocking misalignment between the Spanner Fingers 206 and QD housing 108 when installing the ONT 200 to the QD 100 via compression of the Outer Rotary Drive Spring 212. When Spanner Fingers 206 and QD housing 108 recesses are rotationally aligned, the Outer Rotary Drive Spring 212 extends and preloads the Outer Rotary Drive 208 against the QD housing 108 to ensure proper engagement during torque transmission events. External indicator marks on the Outer Rotary Drive 208 aid in teleoperation.

Hex Drive 210 has a male hex interface that transfers torque to the QD valve interface 110. This functionality is to thread the QD 100 on or off of an FDV. Torque is transmitted to the Hex Drive 210 via a kickout drive spur gear that passes through Housing 224 to actuate a spline drive, supported by Bearings 222, that holds the Hex Drive 210. The Hex Drive 210 can tolerate a clocking misalignment with the female hex feature in QD valve interface when installing the ONT 200 to the QD 100 via compression of Hex Drive Spring 218. When Hex Drive 210 and QD valve interface 110 are rotationally aligned, Hex Drive Spring 218 extends to ensure proper engagement during torque transmission events. Cutouts in Outer Rotary Drive 208 and external indicator marks on Hex Drive 210 aid in robotic operation.

The Hex Drive 210 works with Linear Sleeve 216 to engage three locking balls to mate/demate the ONT 200 to/from the QD 100. The Hex Drive 210 has three pockets where the locking balls can protrude radially to create a positive attachment to mating recesses in QD valve interface 110. The Linear Sleeve 216 is actuated by a linear drive from an end effector or similar device. To mate the Hex Drive 210 to the QD valve interface 110, the end effector (or similar) linear drive travels to drive the Linear Sleeve 216 (via push rods) towards the ONT 100 front end. This causes Linear Sleeve 216 to travel relative to Hex Drive 210, compressing Linear Sleeve Spring 214 and enabling locking balls to retract. When locking balls are retracted, the Hex Drive 210 can be inserted into or removed from QD valve interface 110 female hex. When Linear Sleeve Spring 214 is fully extended, the locking balls are extended which can positively lock the Hex Drive 210 to the QD valve interface 110.

Nozzle End 202 is a propulsion fitting that creates a fluid seal to QD O-rings 142 and actuates QD poppet 134; proper engagement of the Nozzle End 202 with the QD 100 will permit fluid flow from the Propulsion Fitting 230 to the Nozzle End 202. Nozzle End Tip 204 contains a ramped surface to ensure integrity QD O-rings 142 during install of the ONT 200 to QD 100. Nozzle End Tip 204 also contains cutouts around surface and through the main axis to permit fluid flow. Propulsion Fitting 230 is a mechanical propulsion fitting used to connect to an external hose or similar device to the ONT 200.

Linear Indicator 226 has visual markings and is used to communicate tool status to a human operator. Indicator Housing 228 contains the Linear Indicator 226 and associated components. Hex Drive Flange 220 is used to transfer the linear travel status of the Hex Drive 210 to the Linear Indicator 226, Indicator Housing 228, and associated components.

Leak protection in event of FDV primary seal failure is also a benefit to the present approach. There is a reduced risk of inability to release from the client. The ONT and the QD build upon the robotic refueling mission (RRM) EVR Nozzle Tool (ENT)/QD by removing the lock pawls that can only be actuated via proper engagement of the QD to the FDV. This reduces the inability to release from client risk in the event that the QD cannot be removed from the FDV before proper engagement is achieved. Another benefit is independent drive operation. The inner and outer drives of the ONT and QD are independent and as such can be operated simultaneously. A potential advantage of this is to ensure that there is no unintentional motion of the FDV Actuation Nut when performing operations that install/remove the QD to/from the FDV.

Several novel features associated with the QD 100 include a gear train pass-around. The ONT tool is designed such that it the QD can remain coaxial with the interface by utilizing an external "kickout" drive train that transfer the torque delivered by the to the front end of the ONT, where it interfaces with and actuates the QD. The kickout drive transfers the torque around the fluid entry port, i.e. the point where the flexible fuel hose mates to the ONT.

Figure 3:
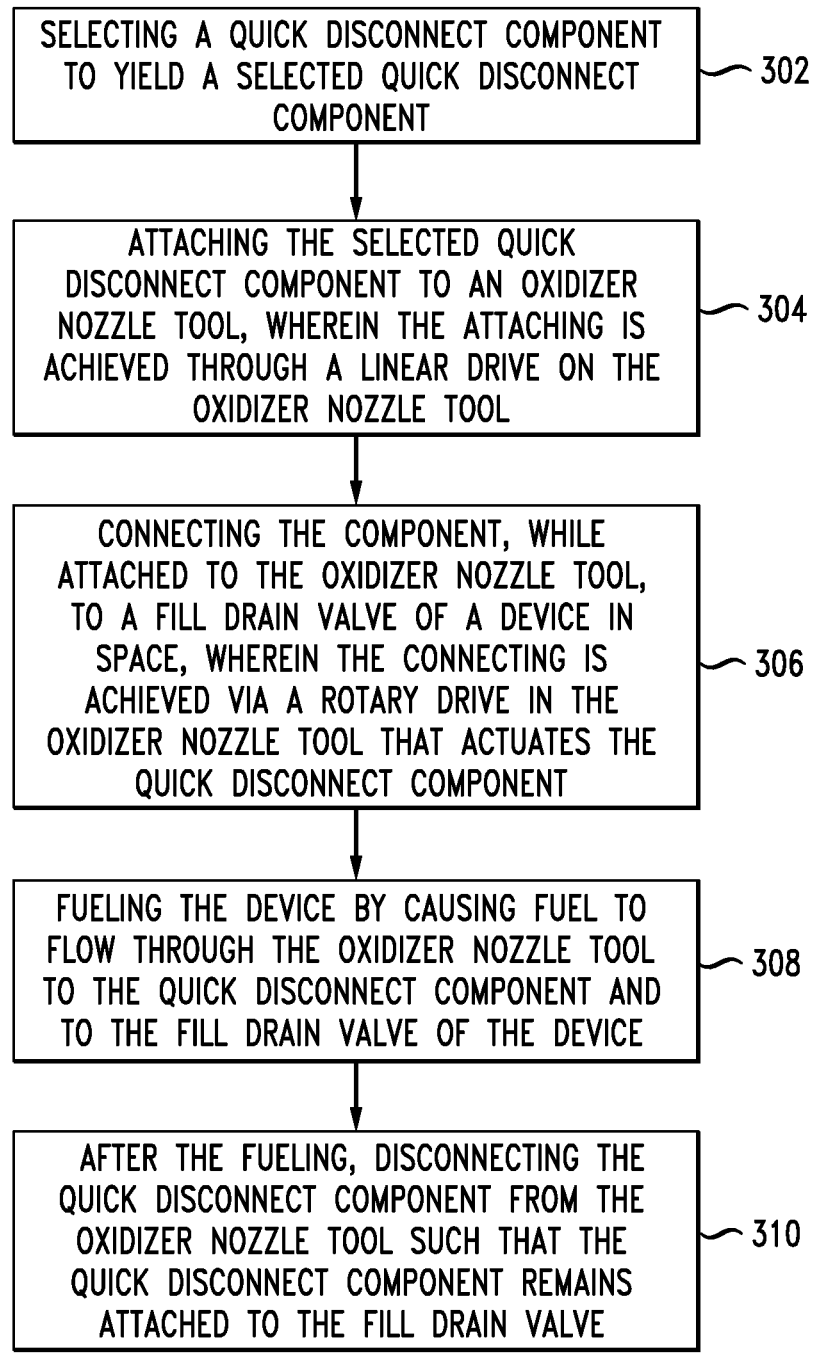
FIG. 3 illustrates an example method embodiment.

FIG. 3 illustrates a method embodiment. A method includes selecting a quick disconnect component to yield a selected quick disconnect component (302), and attaching the selected quick disconnect component to an oxidizer nozzle tool, wherein the attaching is achieved through a linear drive on the oxidizer nozzle tool (304). Next, the method includes connecting the component, while attached to the oxidizer nozzle tool, to a fill drain valve of a device in space, wherein the connecting is achieved via a rotary drive in the oxidizer nozzle tool that actuates the quick disconnect component (306) and fueling the device by causing fuel to flow through the oxidizer nozzle tool to the quick disconnect component and to the fill drain valve of the device (308). After the fueling, the method includes disconnecting the quick disconnect component from the oxidizer nozzle tool such that the quick disconnect component remains attached to the fill drain valve (310).

As noted above, the linear drive and the rotary drive have independent drive operations. The method can include communicating a status of one of the oxidizer nozzle tool and the quick disconnect component via an indicator. The status can relate to at least one of an alignment, a motion and an engagement.

Embodiments within the scope of the present disclosure may also include tangible and/or non-transitory computer-readable storage media or devices for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system comprising:
an oxidizer nozzle tool having (1) a first end, (2) a rotary drive and (3) a linear drive;
a component attached to the first end of the oxidizer nozzle, wherein the rotary drive actuates the component to engage and seal to a drain valve on a device such that the component can open and close the drain value while maintaining the seal, wherein the linear drive is operable to lock and release the component from the oxidizer nozzle tool; and
a hose mated to the oxidizer nozzle tool, wherein upon actuation, fluid flows through the hose to the oxidizer nozzle tool and through the component into the drain valve.

2. The system of claim 1, wherein the component comprises a quick disconnect component.

3. The system of claim 1, wherein the device comprises one of a satellite, a manned crew vehicle, a planetary rover, a space habitat.

4. The system of claim 1, wherein the fluid is propellant.

5. The system of claim 1, wherein the component is configured to engage with different types of drain valves.

6. The system of claim 1, wherein the fluid comprises a pressurant.

7. The system of claim 1, wherein the component further comprises an internal seal to protect against external leakage of the fluid.

8. The system of claim 1, further comprising indicators that communicate at least one of a status, an alignment, a motion and an engagement.

9. The system of claim 1, wherein the component further comprises a leave behind seal such that if a metal to metal seal in a fill and drain valve on the device fails, the leave behind seal protects against leakage.

10. The system of claim 1, wherein all o-ring consumable seals are within the component.

11. The system of claim 1, wherein the rotary drive and the linear drive are independent and can be operated simultaneously.

12. The system of claim 1, wherein the component comprises a micro-filter positioned in close proximity to a sealing interface between the component and the drain valve.

13. A method comprising:
- selecting a quick disconnect component to yield a selected quick disconnect component;
- attaching the selected quick disconnect component to an oxidizer nozzle tool, wherein the attaching is achieved through a linear drive on the oxidizer nozzle tool;
- connecting the component, while attached to the oxidizer nozzle tool, to a fill drain valve of a device in space, wherein the connecting is achieved via a rotary drive in the oxidizer nozzle tool that actuates the quick disconnect component;
- fueling the device by causing fuel to flow through the oxidizer nozzle tool to the quick disconnect component and to the fill drain valve of the device; and
- after the fueling, disconnecting the quick disconnect component from the oxidizer nozzle tool such that the quick disconnect component remains attached to the fill drain valve.

14. The method of claim 13, wherein the quick disconnect component comprises a seal which protects against leakage when a metal-to-metal seal in the fill drain valve fails.

15. The method of claim 13, wherein the quick disconnect component comprises a microfilter positioned in close proximity to the fill drain valve.

16. The method of claim 13, wherein the linear drive and the rotary drive have independent drive operations.

17. The method of claim 16, wherein the oxidizer nozzle tool comprises a second rotary drive.

18. The method of claim 13, wherein the oxidizer nozzle tool comprises no seals.

19. The method of claim 13, further comprising:
- communicating a status of one of the oxidizer nozzle tool and the quick disconnect component via an indicator.

20. The method of claim 19, wherein the status relates to at least one of an alignment, a motion and an engagement.

* * * * *